United States Patent
Darnell

[15] 3,681,779
[45] Aug. 1, 1972

[54] APPARATUS FOR MAINTAINING UNIFORM PAPER TENSION IN A GRAPHICAL RECORDING DEVICE

[72] Inventor: Lawrence W. Darnell, Houston, Tex.

[73] Assignee: Bausch & Lomb Incorporated, Rochester, N.Y.

[22] Filed: July 31, 1970

[21] Appl. No.: 60,040

[52] U.S. Cl..................................346/136, 226/95
[51] Int. Cl..............................................G01d 15/30
[58] Field of Search............346/136; 226/95, 94, 97; 317/2

[56] References Cited

UNITED STATES PATENTS

| | | | |
|---|---|---|---|
| 3,229,301 | 1/1966 | Polster et al. | 346/136 X |
| 3,268,766 | 8/1966 | Amos | 317/2 |
| 3,305,873 | 2/1967 | Mourier | 346/136 X |

Primary Examiner—Joseph W. Hartary
Attorney—Frank C. Parker and Saul A. Seinberg

[57] ABSTRACT

Paper tensioning means incorporated in a graphical recording device provides uniform tensioning across the entire width of fan or Z fold recording paper.

3 Claims, 3 Drawing Figures

PATENTED AUG 1 1972

LAWRENCE W. DARNELL
INVENTOR.

BY SAUL A. SEINBERG

ATTORNEY

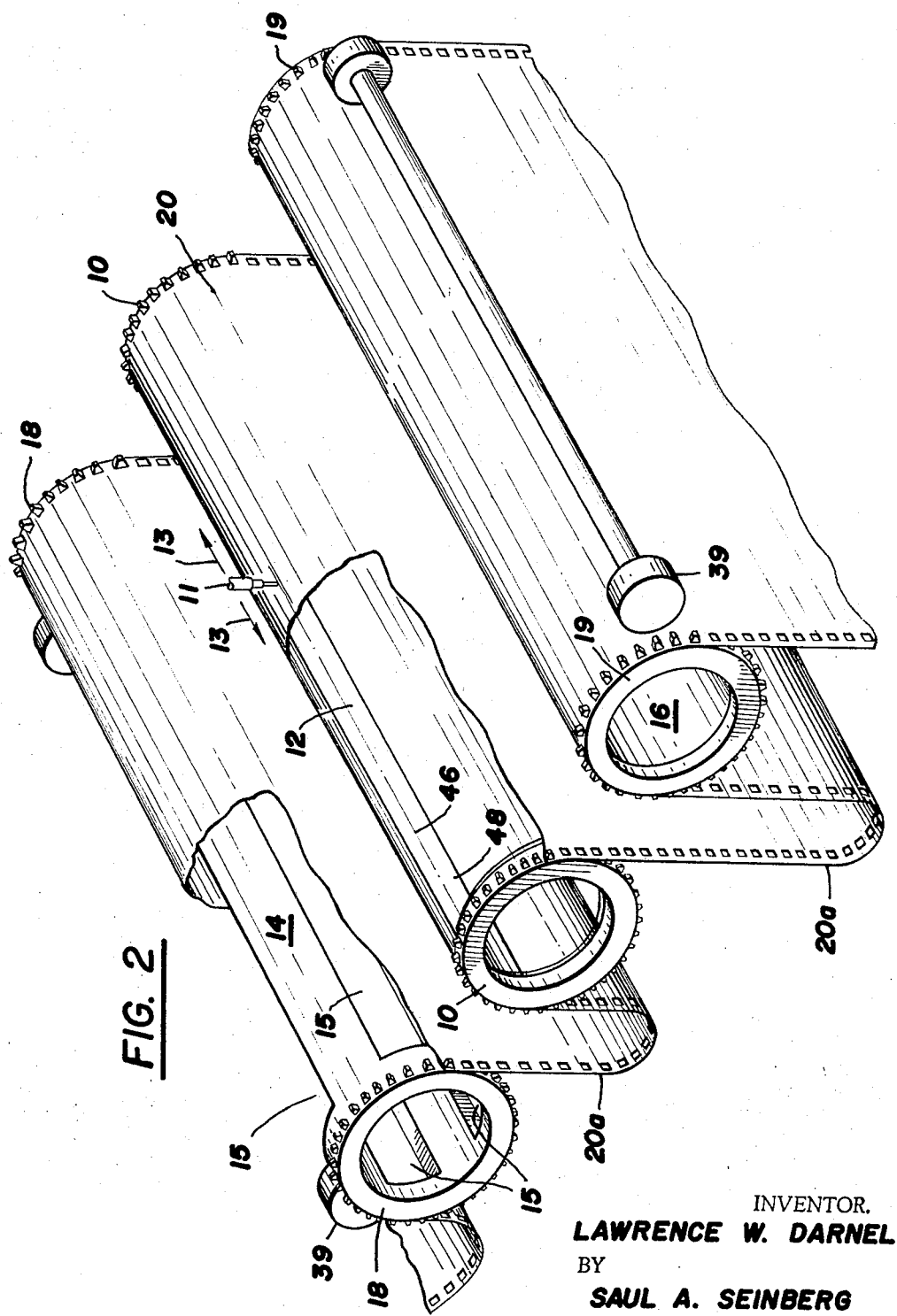

3,681,779

APPARATUS FOR MAINTAINING UNIFORM PAPER TENSION IN A GRAPHICAL RECORDING DEVICE

BACKGROUND OF THE INVENTION

1. Field of the Invention

This invention relates to apparatus for tensioning Z fold recording paper in a graphical recording device and, more particularly, to apparatus which provides uniform tensioning across the entire width of the recording paper.

2. Description of the Prior Art

In the prior art, a number of schemes for bidirectionally driving Z fold recording paper in graphical recording devices are known. Two of these prior art arrangements are disclosed in U.S. Pat. No. 3,460,158, issued to F.R. Bravenec on Aug. 5, 1969, and U.S. Pat. No. 3,475,763, issued to E.V. Hardway, Jr. on Oct. 28, 1969, both assigned to the assignee of the present invention.

As is explained in these references, it is very important to maintain the recording paper under the proper tension regardless of direction of movement or speed thereof. In addition, tension must be maintained even when the recording paper is being started or stopped, subjected to relatively high acceleration or deacceleration or is caused to expand or contract as a result of variations in temperature and/or humidity.

The mechanisms disclosed in the above-identified patents attempted to overcome the problems associated with tensioning the recording paper by providing sprocket drive capability wherein proper tension was achieved through the use of a resilient torque transmitting connection in the drive mechanism. In other prior art mechanisms, maintenance of proper recording paper tension was grounded on the creation of relatively low pressure areas beneath a downwardly depending portion or potions of the recording paper. In these prior art devices, roll chart recording paper was supported in the recording device by a rotating drum generally centrally located in the device between two hollow support tubes having solid walls.

In spite of the advances achieved by the former approaches to the tensioning problems, a tension gradient built up along the width of the recording paper, especially in the case of wide paper. In addition, the failure to satisfactorily minimize the inertial factor of the drive mechanism lessened the effectiveness of these particular prior art schemes in achieving and maintaining proper recording paper tension. In the vacuum buffered Z fold paper drive approach, the tension gradient problem was solved.

SUMMARY OF THE INVENTION

It is, therefore, an object of the present invention to provide capability within a graphical recording device for maintaining the tension of Z fold recording paper constant across its width.

It is another object of the present invention to provide such uniform tension capability under all conditions of operation.

It is a further object of the present invention to provide such uniform tension capability while simultaneously reducing inertial loading of the recorder paper drive mechanism.

Accordingly, there is provided in a graphical recording device a fixed platen having a rotatably mounted recording paper drive sprocket wheel at each end thereof. Two hollow tubes for both supporting the recording paper and maintaining uniform tension thereacross having a plurality of openings therein, are mounted, one on each side of the platen, parallel thereto and in substantially horizontal alignment therewith. Sprocket wheels are fixedly mounted to each end of the supporting tubes, each tube being independently driven by its own servo system. The recording paper which is bidirectionally and independently driven by a stepper or servo motor, is arranged to depend downwardly on either side of the platen between it and the support tubes into separate chambers. Each of the chambers have a low pressure inducing means mounted therein and are approximately equal in length to the distance between the outermost portions of the support tubes and the platen.

Actuation of the low pressure inducing means creates a partial vacuum in each of the chambers thereby pulling the recording paper down over each support tube and the platen. Since the partial vacuum is uniformly created throughout the respective chambers, the recording paper is drawn downwardly uniformly across its entire width.

A plurality of level sensing devices are positioned at appropriate levels within each chamber to control the amount of recording paper depending therein. The level sensors are employed to actuate the independent servo systems which drive the support tubes thereby maintaining the amount of recording paper in each chamber within a predetermined range.

The platen itself has a generally arcuate top surface and does not contribute to the paper drive inertia which results in significantly less inertia than that of the roller used in similar prior art devices. The platen surface is made electrically conductive to minimize any frictional drag on the drive mechanism due to static electricity buildup.

BRIEF DESCRIPTION OF THE DRAWINGS

FIG. 2 is a partial perspective illustration of the apparatus shown in FIG. 1.

DESCRIPTION OF THE PREFERRED EMBODIMENT

Figure 1:
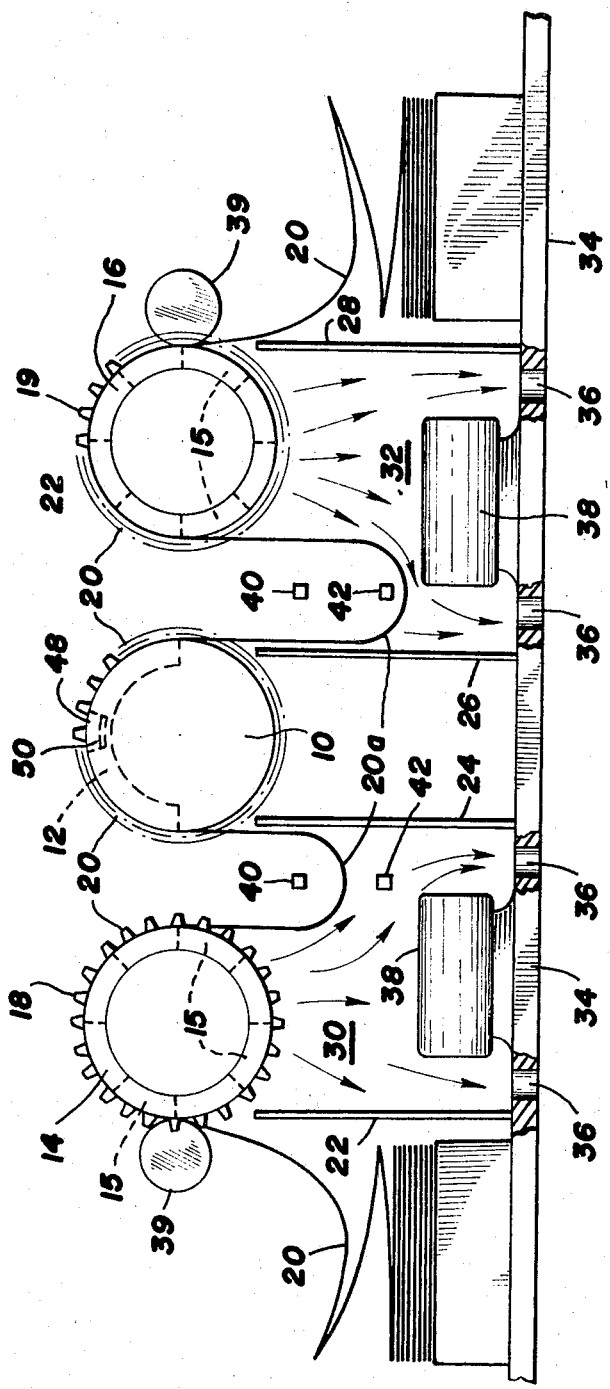
FIG. 1 is a partial side view of apparatus according to the principles of the present invention for maintaining uniform tension across the width of Z fold recording paper within a graphical recording device.

Referring now to the drawings wherein like reference numerals have been used in the several views for like elements, FIG. 1 illustrates a side view of apparatus assembled and interconnected according to the principles of the present invention. A number of elements ordinarily found in graphical recording devices of the type described herein, but which form no part of the present invention, have been omitted from FIG. 1 for the sake of clarity.

In FIG. 1, the main paper drive sprockets 10 are rotatably mounted to a positionally fixed platen 12. As used in this application, the term "recording paper width" is synonymous with and substantially equal to the distance between drive sprockets 10 unless otherwise specified. It will be understood and appreciated by those having skill in this art, that the recording paper width can be less than the distance between sprockets 10 and that, further, the use of lesser paper widths is facilitated by the present invention.

The platen 12 is mounted beneath and parallel to the path, identified by arrows 13, traversed by recording pen 11 across the width of the recording paper 20, as best seen in FIG. 2. Sprocket 10 is driven by a stepper or servo motor (not shown) under the control of the controller (not shown) of the graphical recording device. The role and nature of the controller is more fully explained in T.O. Hall and W.G. Peck's U.S. Pat. application No. 837,043, which is assigned to the assignee of the present invention.

Rotatably mounted on each side of platen 12, and generally parallel thereto, are two cylindrically shaped tubes 14 and 16. The tubes 14 and 16 are coplanar with platen 12, however this alignment is not critical and may vary slightly. Each of the tubes 14 and 16 have a plurality of openings 15 cut therein, the purpose of which shall be hereinafter explained. The openings 15 extend as slots along substantially the entire length of the tubes 14 and 16 although other geometries and positioning would be satisfactory. The length of each of the tubes 14 and 16 is substantially equal to the distance between the sprockets 10. Fixedly mounted to the respective ends of the tubes 14 and 16 for rotation thereof are the tension sprockets 18 and 19.

Two separate servo systems (not shown) are employed to independently drive each of the tubes 14 and 16. Consequently, the recording paper 20 can be driven towards or away from platen 12 by appropriate rotation of either tube 14 or 16. The servo systems used to drive tension sprockets 18 and 19 are well known to those having skill in this art, being commonly referred to as "bang-bang" servos. Some typical examples of these will be found in *Servomechanisms and Regulating System Design*, by Chestnut & MAYER, published by John Wiley & Sons, Inc., or in *Servomechanism Analysis*, by Thaler and Brown, published by McGraw-Hill Book Company, Inc. Other types of control means could satisfactorily be substituted for the servo systems used herein.

Located beneath the tubes 14 and 16 and extending between perpendicular walls 22 and 24 and 26 and 28 are chambers 30 and 32, respectively. Walls 22 and 28 are mounted generally perpendicular to bottom plate 34 and are located in approximate alignment with the outermost surfaces of the tubes 14 and 16. Walls 24 and 26 are mounted generally perpendicular to bottom plate 34 and are located in approximate alignment with the outermost edges of platen 12. It should be noted that the location of walls, 22, 24, 26 and 28 is not critical as will become clear from further reading of this description. Exhaust ports 36 are cut in the bottom of each chamber through bottom plate 34 to provide egress for the air flow introduced therein by the low pressure inducing means 38. It will be understood and appreciated that a single chamber having the same width as chambers 30 and 32 and length equal to the distance between walls 22 and 28 could be used in place of the two chambers. In such a case, only one low pressure inducing means 38 of appropriate capacity need be employed.

As hereinbefore mentioned, mounted in each of the chambers 30 and 32 is the low pressure inducing means 38, which is typically a fan. With the recording paper positioned as shown in FIG. 1, the low pressure inducing means 38 will create reduced pressures in each chamber. The top of each chamber is defined in part by the downwardly extending segment 20a of the recording paper and the inner portions of the tubes 14 and 16 which are exposed to the effect of the low pressure inducing means 38 by the openings 15. In the preferred embodiment, by way of example, a plurality of the slots 15 are cut in each of the tubes 14 and 16.

In FIG. 1, the recording paper 20 is fed to and accumulated from the graphical recorder in Z fold or fanfold fashion. Consequently, auxiliary rollers 39 are employed to urge or hold the recording paper 20 against the outer edge surfaces of tubes 14 and 16, thereby preventing misbehavior of the recording paper 20 in the event of external disturbance.

Mounted at appropriate predetermined levels within each of the chambers 30 and 32 is a high level sensor 40 and a low level sensor 42. When the recording paper 20 falls below the low level sensor 42 or rises above the high level sensor 40, the servo systems will cause the tension sprockets 18 and 19 to rotate in whatever direction is appropriate to move the paper level in each chamber to a level between the respective sensors 40 and 42. In the described embodiment, it is preferred to use photoelectric devices of a type well known in the art. However, vacuum switches or any other equivalent device could be satisfactorily employed.

In operation, the application of power to the recording device activates the low pressure inducing means 38. At the same time, the independent servo systems which drive tension sprockets 18 and 19, cause the recording paper 20 to assume a level between sensors 40 and 42 in each of the chambers 30 and 32. The air flowing into each chamber gently, but firmly, uniformly pulls the recording paper 20 over the platen 12 and the tubes 14 and 16. Since the chambers 30 and 32 extend under the full width of the recording paper 20, the uniform downward forces created by the low pressure inducing means 34, uniformly tensions the recording paper 20 over the full length of the platen 12 and the tubes 14 and 16. Consequently, under the usual operating conditions, accurate and sharply drawn recordings are made possible. The same results are obtained if a drum (not shown) is used in place of the platen 12 and/or a single chamber are employed.

Due to the uniform tensioning effect achieved through use of the hollow tubes 14 and 16 having appropriately sized and spaced openings 15 therein, recording paper 20 of less than full width can be readily used without replacing or modifying any portion of the described apparatus. For example, half-width paper would engage only one of the tube sprockets while the remainder of the paper is uniformly tensioned and held down by the differential pressure created below tubes 14 and 16. It should be noted that the geometry and placement of the openings 15 are dependent upon such factors as paper width, thickness and strength, among others. In view of the almost infinite number of these combinations, only one example of opening 15 geometry and placement has been described. However, it will be readily appreciated and understood that the present invention is not limited to this one example, but encompasses all possible shapes and placements of the openings 15.

When Z fold paper is used, as shown in FIG. 1, rotation of the main paper drive sprockets 10 will cause the recording paper 20 to advance into one of the chambers and be drawn out of the other. During this period, the effect of the low pressure inducing means 38, coupled with the action of the independent servo drive of the tension sprockets 18 and 19, keeps the paper tension uniform across its entire width. However, since the recording paper slips or slides over the top surface of platen 12, it is possible for static electricity to build up, thereby causing uneven electrostatic forces to be distributed over the platen surface. If no attempt were made to correct for this, the paper tension, in spite of the previously described efforts, could not be held uniform. Consequently, the platen surface is made conductive and grounded to allow static charge to leak off rather than build up to intolerable levels. In addition, by maintaining uniform tension across the entire width of the recording paper 20 there is reduced likelihood that the recording pen 11 will pierce the recording paper 20. Such an undesired result was not an infrequent one in prior art devices, especially when the recording pen 11 traversed the fold perforations which run across the full width of the paper 20 at predetermined intervals.

As previously mentioned, the platen 12 is held fixed while the recording paper 20 is driven thereacross. In prior art devices, a drum was used in place of the platen 12 and rotated along with the main paper drive sprockets 10. By substituting the considerably lower mass of the platen 12 for the prior art drum, the inertial loading on the main paper drive mechanism is significantly reduced. Thus, under conditions of start, stop or reverse, all of which operations must be done fairly rapidly, much sharper recordings, than were heretofore possible, can be obtained.

Figure 3:
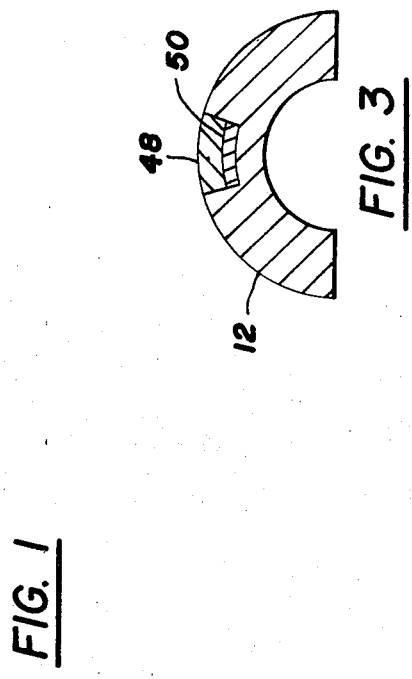
FIG. 3 is a sectional view taken along line A—A' in FIG. 2.

Since the platen 12 is held fixed in position, the recording pen 11 will be contacting it only on center line 46, as shown in FIG. 2, along the upper surface of the platen 12. Consequently, as is shown in FIG. 3, a removable insert 48, at least the top surface of which is conductive, is slidably mounted in the platen 12. To further cushion the repeated shocks caused by the recording pen 11 impacting the recording paper 20 and platen 12, a resilient pad 50 is mounted beneath the insert 48. The resilient pad 50 aids in preventing excessive marring of the platen surface. It also reduces the impact effect of the pen 11 on the recording paper 20. The fixed platen 12, the removably mounted insert 48 and resilient pad 50 are all used regardless of the width of recording paper 20 employed.

It will be understood and appreciated that many modifications or changes could be made in the preferred embodiment described herein and that, further, alternate means of implementation thereof are possible. Consequently, while the present invention has been described by way of specific examples, it is not to be solely limited thereto since obvious modifications thereof will occur to those skilled in the art without any departure from its spirit and scope.

I claim:

1. A graphical recording device of the type having main recording paper drive means for bidirectionally driving folded recording paper through said device where said folded recording paper has folds extending transversely to the direction of driving of the folded recording paper, a pair of spaced rotatable main drive sprockets connected to said drive means for engaging and driving the folded recording paper, a movable recording pen traversable between said drive sprockets, a chamber located below said drive sprockets approximately equal in width to the spacing between said drive sprockets and extending, at least, past either side of said drive sprockets, low pressure inducing means mounted in said chamber for drawing said folded recording paper uniformly over its entire width into said chamber, a plurality of level sensors mounted in said chamber for sensing the level reached by said folded recording paper in said chamber and further comprising:

a. a platen disposed beneath said recording pen and between said rotatable drive sprockets for carrying the folded recording paper;

b. a pair of recording paper support tubes, one each of said tubes disposed on opposite sides of the platen for carrying the folded recording paper to impend the recording paper into the chamber between each support tube and the platen;

c. a plurality of tension sprockets fixedly mounted on each end of each of said support tubes for engaging and driving the folded recording paper;

d. first servo means responsive to at least one of said level sensors and connected to at least one of said tension sprockets to rotatably drive one of said support tubes so that said folded recording paper reaches a predetermined level in said chamber between said driven support tube and said platen;

e. second servo means responsive to at least one of said level sensors and connected to at least one other of said tension sprockets to rotatably drive the other of said support tubes so that said folded recording paper reaches a predetermined level in said chamber between said last mentioned driven support tube and said platen whereby actuation of said low pressure inducing means will uniformly tension said folded recording paper across its entire width about said platen and said support tubes irrespective of movement of said main drive sprockets; and f. a pair of roller assemblies, one each for engaging a first surface of the folded recording paper and disposed to urge engagement of the opposite surface of the folded recording paper with the tension sprockets of each respective support tube, each roller assembly disposed on a side of each respective recording paper support tube generally farthest from the platen disposed between the pair of recording paper support tube.

2. The device according to claim 1, wherein said platen has a grounded conductive surface.

3. The graphical recording device as defined in claim 1, wherein the platen is positionally fixed irrespective of movement of the rotatable drive sprockets.

* * * * *